United States Patent [19]
Vassilicos

[11] Patent Number: 5,511,766
[45] Date of Patent: Apr. 30, 1996

[54] FILTRATION DEVICE

[75] Inventor: Achilles Vassilicos, Allegheny County, Pa.

[73] Assignee: USX Corporation, Pittsburgh, Pa.

[21] Appl. No.: 313,944

[22] Filed: Sep. 28, 1994

Related U.S. Application Data

[63] Continuation of Ser. No. 12,490, Feb. 2, 1993, abandoned.

[51] Int. Cl.$^6$ ..................................................... C22B 9/02
[52] U.S. Cl. ........................... 266/78; 266/227; 75/387; 75/407
[58] Field of Search ..................... 266/78, 227; 75/407, 75/387

[56] References Cited

U.S. PATENT DOCUMENTS

| | | |
|---|---|---|
| 3,814,167 | 7/1974 | Listhuber et al. . |
| 4,125,146 | 11/1978 | Muller et al. . |
| 4,277,281 | 7/1981 | Weber et al. . |
| 4,640,497 | 2/1987 | Heamon . |
| 4,940,489 | 7/1990 | Cummings . |
| 4,995,592 | 2/1991 | Kegan et al. . |
| 5,028,036 | 7/1991 | Sane et al. ....................... 266/227 |
| 5,064,175 | 11/1991 | Soofi . |
| 5,083,753 | 1/1992 | Soofi . |
| 5,114,472 | 5/1992 | Eckert et al. . |

OTHER PUBLICATIONS

Aubrey, Brockmeyer, Mauhar—"Ceramic Foam–An Effective Filter For Molten Steel" (pp. 997 thorugh 991).

*Primary Examiner*—Melvyn Andrews
*Attorney, Agent, or Firm*—Armstrong, Westerman, Hattori, McLeland & Naughton

[57] ABSTRACT

A vessel used for transfer of molten metal having a refractory filter wall with filters for removing inclusion from molten metal as it flows through the vessel. The refractory filter wall having passages sized according to a predetermined volume of molten metal that is to be filtered, the desired flow rate of molten metal through the vessel and the limiting characteristics of the filters. In another aspect of the invention, protrusions are provided on refractory walls of the vessel to enhance deposition of non-metallic inclusions on the protrusions by disrupting the boundary layer flow in the molten metal.

11 Claims, 7 Drawing Sheets

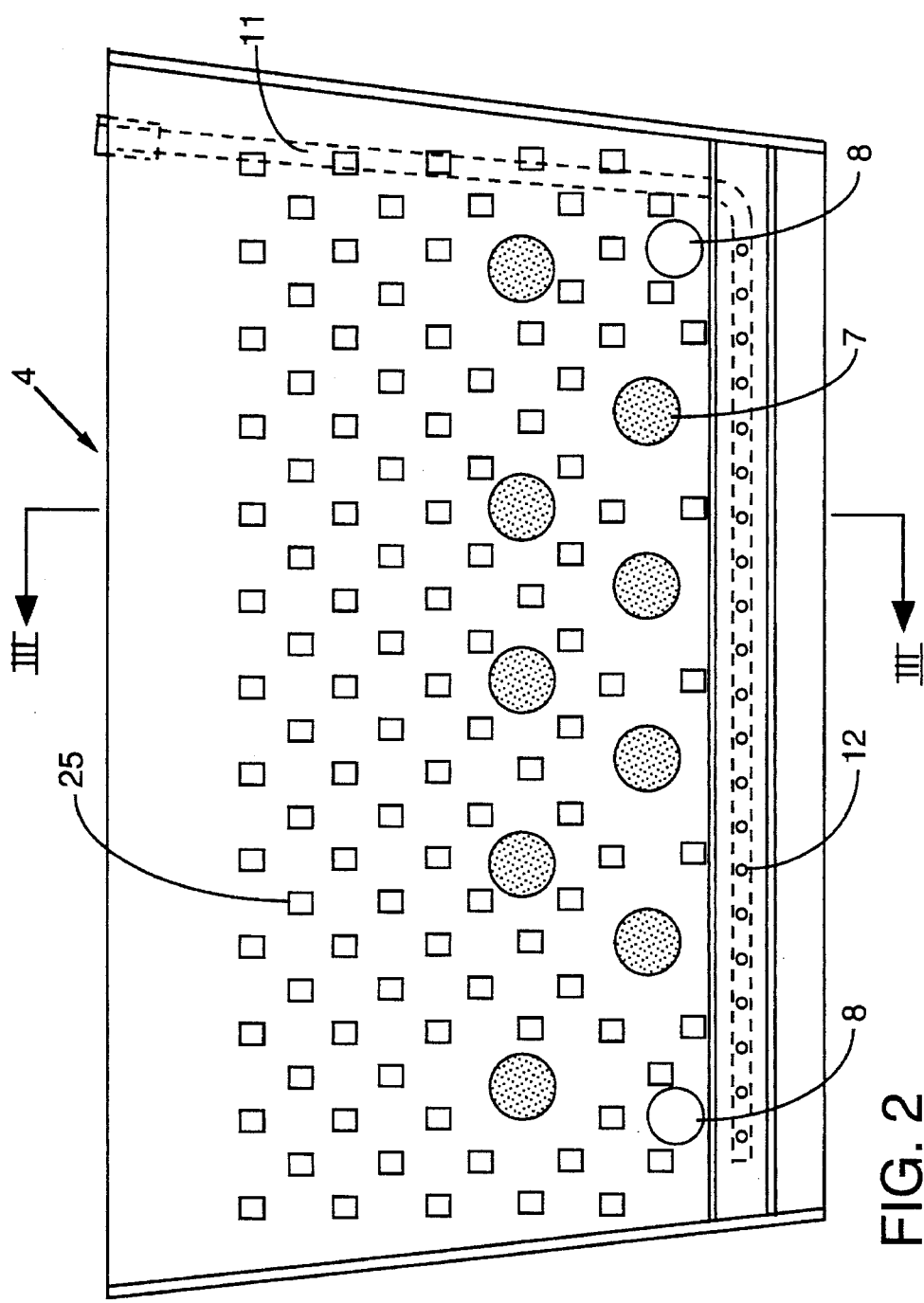
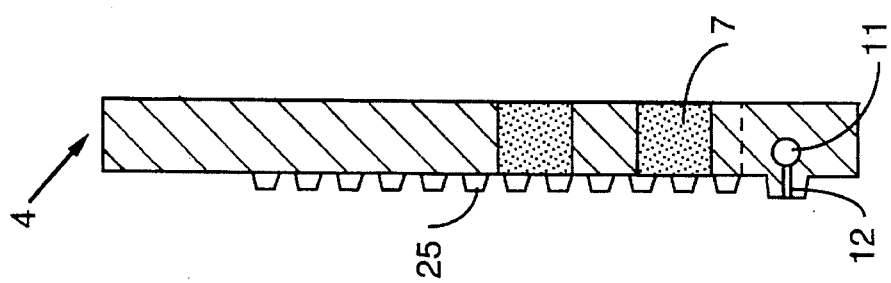

5,511,766

1

FILTRATION DEVICE

This application is a continuation of Ser. No. 08/012,490, filed Feb. 2, 1993, now abandoned.

FIELD OF THE INVENTION

The present invention relates to an apparatus for removing undesired impurities from molten metal in a tundish. This invention is applicable to removing impurities from any molten metal, but will be described as it applies to steel.

BACKGROUND OF THE INVENTION

In the production of metals by the continuous casting method, molten metal is transferred from a ladle to an intermediate tundish that has one or more nozzles for transferring the molten metal in the tundish to the mold from which the continuously cast metal is manufactured. In general, the molten metal contains undesired impurities from sources such as particles of refractory from the lining of a vessel that contains the molten metal, alumina as a byproduct of deoxidation and reoxidation, fragments of slag or other insoluble impurities. Upon solidification of the cast product, these impurities adversely affect product properties such as surface finish, drawability, weldability, formability and strength.

It is, therefore, desirable to remove any remaining unwanted impurities from the molten metal immediately prior to casting. Ceramic foam filters and cellular filters, as they are known in the art, have been shown to be capable of removing unwanted impurities from high temperature molten metal. Aubrey, *Ceramic Foam—An Effective Filter for Molten Steel*, presented at the Fifth Intl. Iron & Steel Congress, Washington, D.C., Apr. 7–9, 1986.

U.S. Pat. No. 4,940,489 describes a molten metal filtration system whereby a dam is provided on the discharge side of a ceramic filter wall to collect molten metal, such that hot molten metal is present on both sides of the ceramic filter to prevent freezing of molten metal in the filter element during priming of the filter element. In the actual practice of this system, the flow rate of molten metal is too slow and the filter plugs too quickly, such that the usable life of the ceramic filter is short as compared to the tundish life. As a remedy, it has been suggested that passages be placed through the filter wall, allowing molten metal to flow unfiltered to the tundish discharge. The passages are placed in the filter wall without any specific consideration concerning the size of the passage, other than to freely permit the flow of metal even when the filter elements are completely plugged. I have found that this remedy is inefficient because it allows large amounts of molten metal to pass through the wall unfiltered, and as little as 5% of the molten metal passes through the filter and is actually filtered.

U.S. Pat. No. 5,064,175 describes a method whereby depressions are fabricated into the refractory surface that contacts the molten metal in a tundish vessel. The resulting depressions on the refractory surface provide for greater surface area for inclusions in molten metal, such as alumina, to adhere. The present invention, providing for protrusions from a continuous flat or nearly flat refractory surface, operates quite differently. Refractory protrusions into the molten metal stream from the refractory wall operate to disrupt the surface boundary flow to create eddies in the molten metal adjacent to the protrusions, as the molten metal circulates along the refractory surface. The eddies provide an optimum location where fluid flow conditions and surface conditions are favorable for alumina to be deposited. This aspect of the present invention offers enhanced deposition because it is not relying on increased surface area to increase deposition of alumina, but relies upon disruption of fluid flow at the fluid/refractory boundary.

Accordingly, it is an object of the present invention to provide a molten metal purification and filtration apparatus which increases filtration efficiency of molten metal.

SUMMARY OF THE INVENTION

The foregoing objects are achieved by a tundish filtration apparatus comprising a refractory lined tundish for receiving molten metal and one or more discharge nozzles for discharging said molten metal to a casting mold, said tundish having one or more filter walls in the tundish traversing the molten metal fluid flow, separating said tundish into chambers, said filter wall having means suitable for the filtration of molten metal.

It is the object of this invention to achieve molten metal flow rates through the tundish in accordance with modern casting speed requirements while maximizing the filtration of molten metal, prevent freezing of molten metal in the filters during the initial filling of a new tundish box with molten metal and extending use of the tundish equipped with this filter wall to numerous melts. This is accomplished by placing one or more passages through the filter wall or around the filter wall. The passages provide for continuous molten metal passage through or around the wall. The advantage of the use of the passages in this invention is that the passages are sized using formulae that relate their free cross sectional area to the available free cross sectional area of the filters, the ferrostatic head differential across the filter wall, the casting flow rate, and the fraction of casting flow rate that flows through the filters. In so doing, a casting practice that requires certain steel filtration parameters to be met, can be designed and fully controlled. Optionally, to maximize the fraction of molten metal flow passing through the filters, said passage or passages can be variable in cross sectional area by using a stopper rod or other flow control device that is well-known in the art.

The filter wall location in the tundish depends on the size of the inclusions desired to be filtered from the molten metal. In a tundish, the coarse inclusions are generally in the area of the molten metal inlet stream. There are means known to those skilled in the art, other than filtration, that are effective for removing coarse inclusions from the molten metal in the molten metal inlet stream area of the tundish. The fine inclusions in the molten metal are generally carried by the molten metal toward the discharge area. The removal of fine inclusions is the primary application of molten metal filtration although filtration of coarse inclusions is equally applicable. Because the fine inclusions are carried to the discharge nozzle area, it is desirable to place the filter wall as close to the discharge nozzle as possible where the inclusion size is the smallest. Similarly, to remove coarse inclusions filtration of molten metal can be done in the inlet stream area.

Additionally, it is a further object of this invention to cause increased deposition of inclusions on one or more refractory baffle walls placed in the tundish upstream from the filter wall. Said refractory baffle walls are in a position traversing the fluid flow, separating said tundish into chambers and are equipped with passages permitting the flow of molten metal therethrough. One or more of said refractory baffle walls, interior longitudinal side walls, and end walls of the tundish, filter walls, and bottom are fabricated with small protrusions on one or more planar surfaces to meet this objective.

The advantage of the refractory protrusions is that the refractory protrusions enhance the deposition of inclusions in molten metal such as alumina by disrupting the boundary-layer of flowing molten metal adjacent to the refractory surfaces as it flows over and around these protrusions. The refractory baffle walls may also have a series of small openings or a strip of porous refractory material embedded into the baffle wall at an elevation which is lower than the area populated by these protrusions, through which an inert gas, such as argon, is bubbled to form a curtain of bubbles flowing upwardly along the surface of the baffle wall. The advantage of the inert gas injection is that the motion of the gas bubble curtain induces a continuous current of molten metal flow past the protrusions, and by way of boundary-layer disruption provides a mechanism for the enhanced deposition of inclusions. Features of the present invention appear herein below.

BRIEF DESCRIPTION OF THE DRAWINGS

FIG. 2 is a longitudinal elevation view of the filter wall as viewed from II—II in FIG. 1.

FIG. 3 is a sectional view of the filter wall taken at III—III in FIG. 2.

PREFERRED EMBODIMENT OF THE INVENTION

Figure 1:
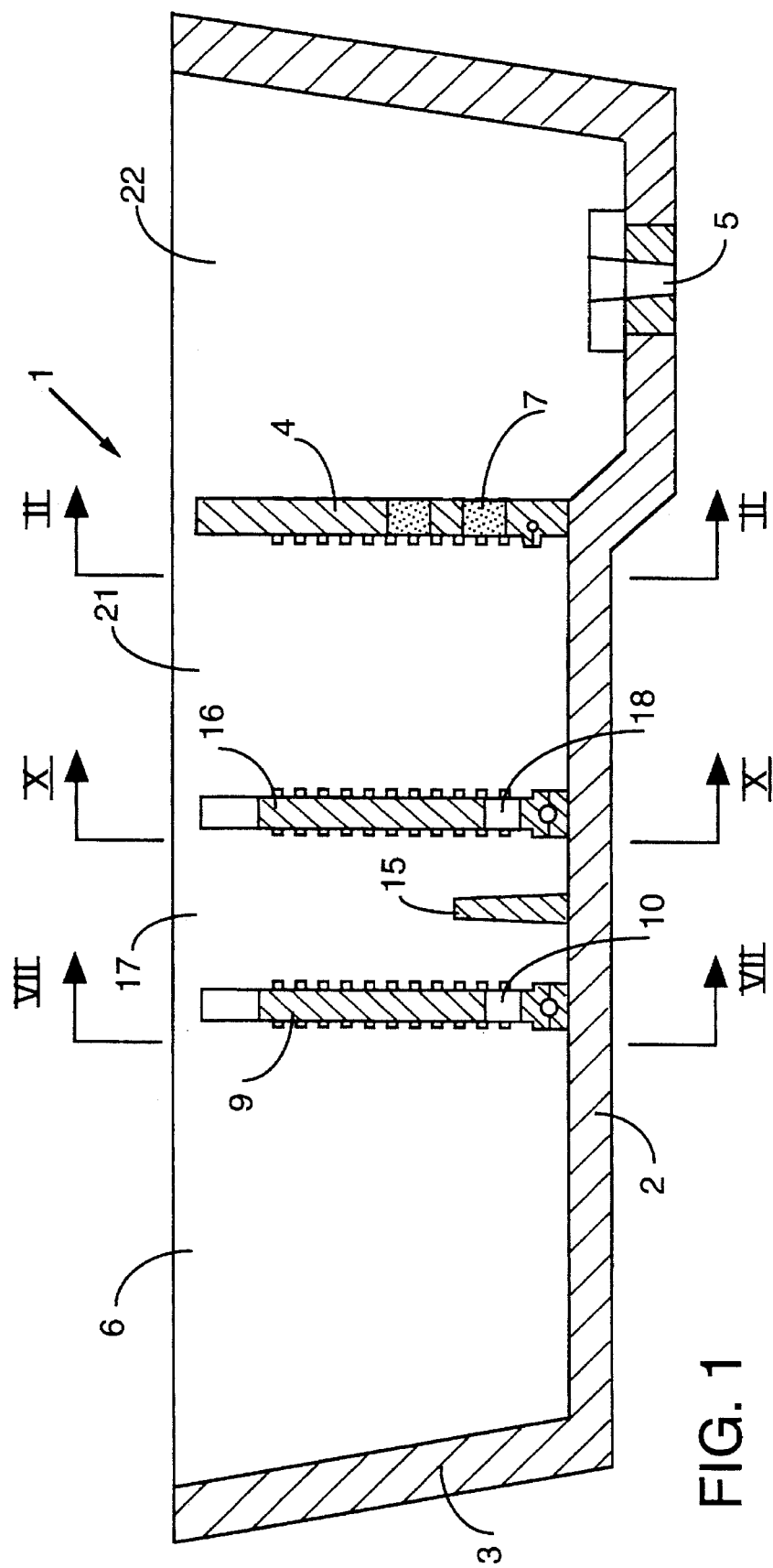
FIG. 1 is a sectional view of a tundish.

Referring to FIG. 1 of the drawings, the tundish (1) is shown with a refractory bottom (2) and refractory side walls (3). The tundish is equipped with a refractory filter wall (4), a primary baffle wall (9) and a secondary baffle wall (16) according to the invention traversing the molten metal flow.

The refractory filter wall extends completely across the tundish cavity to opposing tundish walls and is located near the discharge nozzle (5). In use, the molten steel is cleaner near the discharge nozzle because inclusions in this area are generally finer than inclusions in the molten steel in the inlet chamber (6).

The refractory filter wall, as illustrated in FIG. 2 and FIG. 3, is constructed from a molten steel resistant refractory of the high alumina type with an alumina content of at least 65%, or any other refractory material suitable for use with molten steel. Built into the refractory filter wall is a plurality of filter elements (7) of the type made by Corning Corporation and available from Foseco Corporation, or of the type prepared in accordance with U.S. Pat. No. 3,962,081, or any filter element suitable for use with molten steel.

Preferably, the filter elements are located in the lower half of the refractory filter wall to permit operation with a substantial ferrostatic head differential across the filter wall. In a typical 45 ton tundish with a molten steel depth of 38 inches, 9 filter elements with an initial total open cross sectional area of 51 square inches is required to achieve a molten steel flow rate of 4.0 tons per minute and an initial filtration of 65% of the molten steel flow. Typically, there is a 16 inch ferrostatic head differential across the refractory filter wall. As illustrated in FIG. 2, the filter elements are placed near the base of the filter wall in two rows, the bottom row having four filter elements and the top row having five filter elements. Other arrangements of the filter elements, as would readily be apparent to one skilled in the art are also possible to achieve the same results.

To accomplish the aforementioned desired initial flow rate of molten steel, two circular passages (8), permitting the unfiltered passage of molten steel through the filter wall, are placed near the base of the filter wall, adjacent to the tundish side wall. The cross sectional area of the passages is selected based upon the initial flow resistant coefficient of the filter elements so as to accomplish a desired initial distribution of the volume of molten steel through the filters with respect to the flow of molten steel through the passages. The minimum passage cross sectional area is 0.75 square inches so as to differentiate it from a filter passage. For the aforementioned flow rate parameters, the diameter of each of the two passages according to this invention is 3¼ inches. The passages serve to make filtration possible on a large scale basis, and while not achieving 100% metal filtration, I have determined that substantially increased filtration can be obtained, as compared to the prior art, for the duration of the tundish campaign without freezing off or plugging of the filter elements, in which case there will be a passage of an excessive amount of unfiltered molten steel through the tundish. Greater percentages of molten steel filtration are possible by the teachings of this invention.

Figure 4:
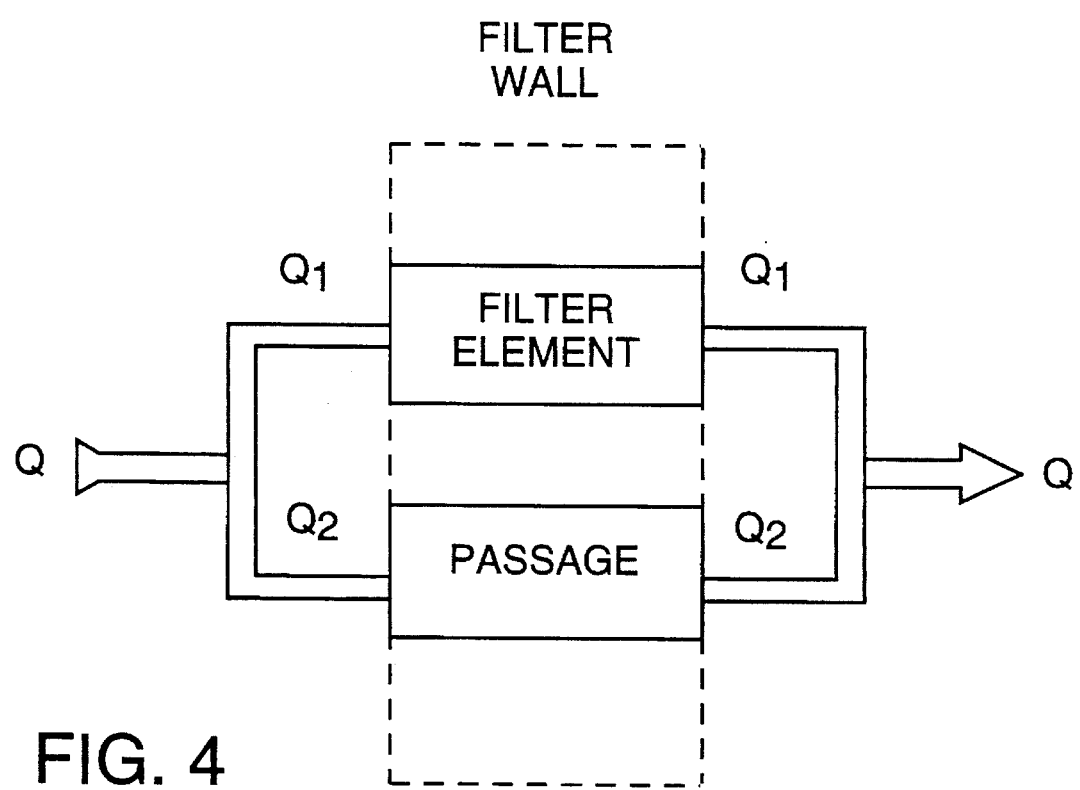
FIG. 4 is a flow division diagram depicting molten metal flow through the filter wall.

To determine the opening size in the filter wall, the total required molten steel volumetric flow rate based upon desired casting speed must first be determined. FIG. 4 is a flow chart illustrating the distribution flow of molten steel through the filter wall using symbols hereinafter defined.

The following equation that relates the steel bath level differential to steel velocities through the openings in the filter elements should be applied to determine the size of the openings:

$$\Delta H = K_1 \frac{U_1^2}{2gc} + \frac{U_1^2}{2gc} = K_2 \frac{U_2^2}{2gc} + \frac{U_2^2}{2gc}$$

By algebraic manipulation of this equation, the following equations are also useful:

$$\frac{A_2}{A_1} = \sqrt{\frac{K_a+1}{K_i+1}} \left( \frac{Q}{Q_1} - 1 \right)$$

$$\frac{Q_1}{Q} = \frac{\frac{A_1}{A_2} \sqrt{\frac{K_2+1}{K_1+1}}}{1 + \frac{A_1}{A_2} \sqrt{\frac{K_2+1}{K_1+1}}}$$

-continued $$A_1 = \frac{Q\sqrt{\frac{K_2+1}{2gc\Delta H}} - A_2}{\sqrt{\frac{K_2+1}{K_1+1}}}$$

$$Q = Q_1 + Q_2; \quad U_1 = \frac{Q_1}{A_1}; \quad U_2 = \frac{Q_2}{A_2}$$

The total volumetric flow rate of molten steel is designated as Q as shown in FIG. 4. The volumetric flow rate of molten steel through the filter elements is designated as $Q_1$ and the volumetric flow rate of molten steel through the passages is designated as $Q_2$. Furthermore, $g_c$ is the acceleration constant equal to 9.81 meters per second squared in metric system and 32.2 feet per second per second squared in the English system. The molten steel velocity through the filter element is designated as $U_1$ and the molten steel velocity through the opening is designated as $U_2$. $A_1$ is the cross sectional area open to flow in the filter elements which is a standard characteristic by which the filter elements are manufactured, and $A_2$ is the cross sectional area of the opening. $K_1$ designates the flow resistance coefficient for the filter element flow passage, while $K_2$ designates the flow resistance coefficient for the opening.

Figure 5:
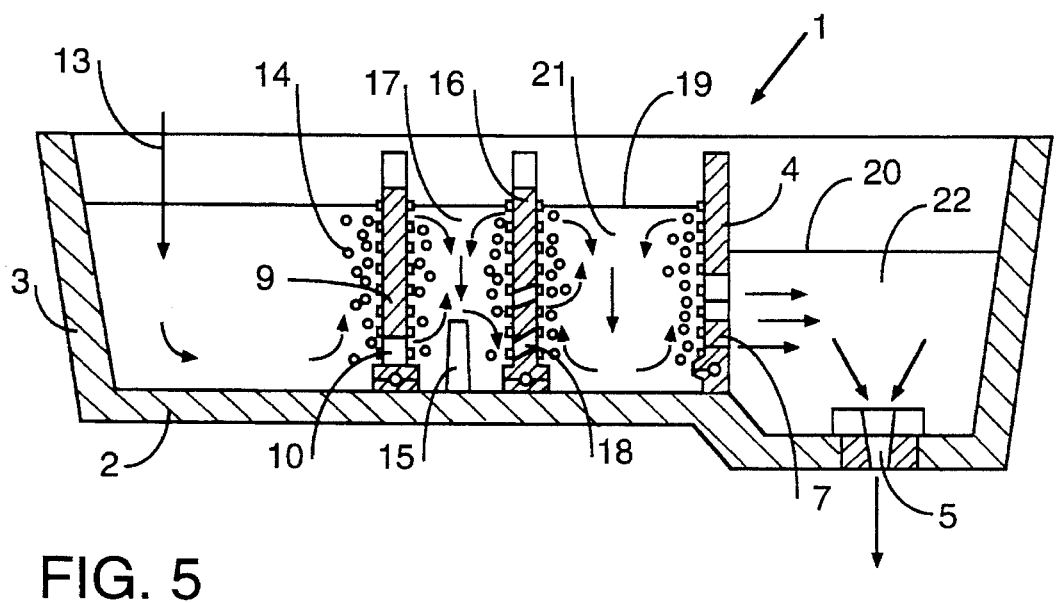
FIG. 5 is a schematic showing molten metal flow in the tundish.

The molten steel liquid level downstream from the filter wall (20) as illustrated in FIG. 5 will be less than the molten steel level upstream (19) from the filter wall. The difference in the molten steel levels, known as the ferrostatic head differential, is the mechanism that provides the pressure to cause molten steel to flow through the filter wall, the ferrostatic head differential is designated by the symbol $\Delta H$. $\Delta H$ is best determined by subtracting the molten steel height downstream, as determined by some reference level, from the molten steel height upstream, as determined from the same reference level.

The flow resistance coefficient is a characteristic of the type of filter acquired from the manufacturer. The flow resistance coefficient does not vary significantly for the same specified filter element, so that once known for any designated filter specification, it remains sufficiently constant for all filters of that specification. The flow resistance coefficient is determined by:

$$K = \left(\frac{U_i}{U_a}\right)^2 - 1$$

Where $U_a$ is the actual velocity of molten steel through the filter elements that corresponds to the unitary mass flow rate. The unitary mass flow rate is the mass flow rate for one unit of cross sectional area and one unit of differential ferrostatic head. $U_i$ is the theoretical velocity of molten steel that would be obtained for the same flow conditions, but in the absence of ferrostatic head losses.

The actual velocity of molten steel through a filter, per unit of open cross sectional area is determined by:

$$U_a = \frac{\dot{q}}{\rho A}$$

And the theoretical velocity of molten steel through a filter element per unit of open cross sectional area is determined by:

$$U_i = \sqrt{2g\Delta H}$$

Usually, manufacturers of the filter elements provide the unitary flow rate of the particular size of the filter supplied. The unitary flow rate is expressed in lbs./(sec.) (in.)² (in. head) and designated by the symbol $\dot{q}$. $\rho$ is the mass density of molten steel and A is the cross section area of the opening. This value can also be determined experimentally by placing a filter in the bottom of a vessel such that the ferrostatic head differential is equal to the depth of the bath, filling the vessel with molten steel and allowing the molten steel to flow through the filter while maintaining a constant bath depth, determining the mass flow rate per unit of time at the constant bath level by physical measurement, and expressing this mass flow rate in terms of one open square inch of cross-sectional area of the filter per one inch of ferrostatic head.

The flow resistance coefficient for the openings through the wall can be determined by a similar method of actually measuring flow characteristics of a similar opening as molten steel flows through the opening. Also, the flow resistance characteristic of the opening can be determined based upon well-known practices in the field of fluid mechanics. The flow resistance coefficient can be expressed as the sum of the entrance loss of the opening and the frictional loss of the walls of the opening passageway. The entrance loss of a circular opening in a planar wall perpendicular to the planar surface is about 0.55 and the frictional loss of the walls of the opening passageway, designated as $K_p$, can be expressed as follows:

$$K_p = f_p \frac{L_p}{D_p}$$

$f_p$ is a friction factor of the passage wall as a function of Reynold's number, $L_p$ is the length of the opening and $D_p$ is the diameter of the opening. A typical value for the friction factor of the walls of the opening passageway is about 0.06. Accordingly, it should be obvious to one skilled in the art that by applying the foregoing analysis in any molten steel filtration application in a vessel, a filter wall can be constructed according to user requirements that provides for the maximum filtration efficiency by properly sizing the openings in the filter wall.

Figure 6:
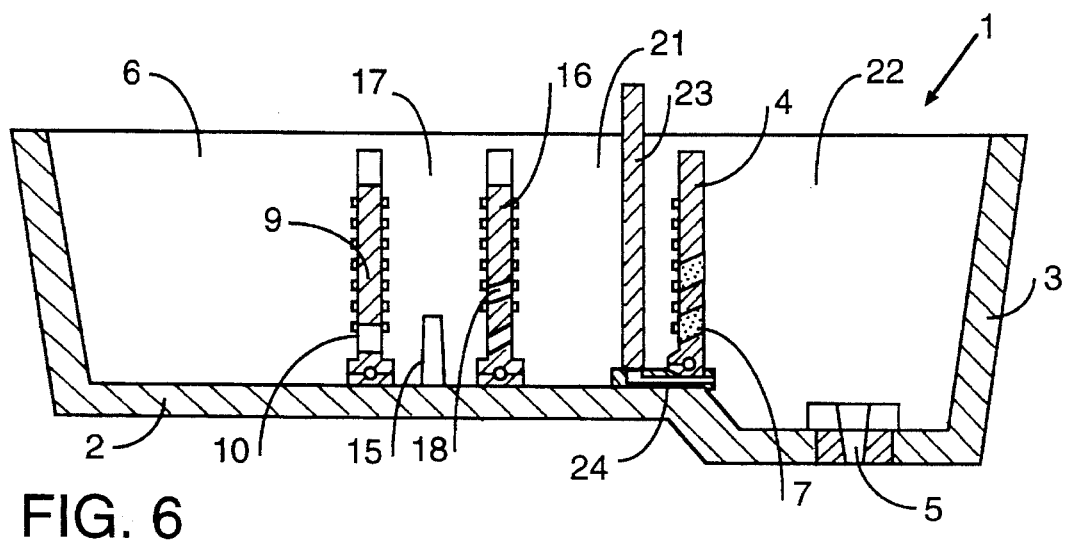
FIG. 6 is a section view of a tundish with a flow control device.

To further improve the filter wall apparatus in terms of further increasing the portion of molten steel being filtered, the passage that permits the molten steel to pass through or around the filter wall could be equipped with a flow control device (23) such as a stopper rod as illustrated in FIG. 6 or a slide gate valve. It is anticipated that the flow control device will be utilized to initially provide a fully open passage during tundish start-up, then to substantially decrease the size of the passage to restrict flow through the passage during casting causing molten steel to be filtered as a result of the pressure created by creating and maintaining a ferrostatic head differential. Finally, the flow control device is gradually opened when the ferrostatic head differential approaches the structural limit of the filter wall, typically about 16 inches to increase the cross-sectional area of the passage permitting increased flow. By noting the position of the flow control device, the cross sectional area of the passage around the filter wall (24) is also known. By application of the above equations, the flow distribution of molten steel between the filter elements and molten steel, is therefore, always known during the cast. As the user gradually increases the cross sectional area through the use of the flow control device, it will be possible to ascertain at what point during the cast, the filtration requirements of the user are no longer met. The cast may continue with the flow control device open to the maximum and the steel that is cast can be applied to an application that does not require filtration.

Figure 7:
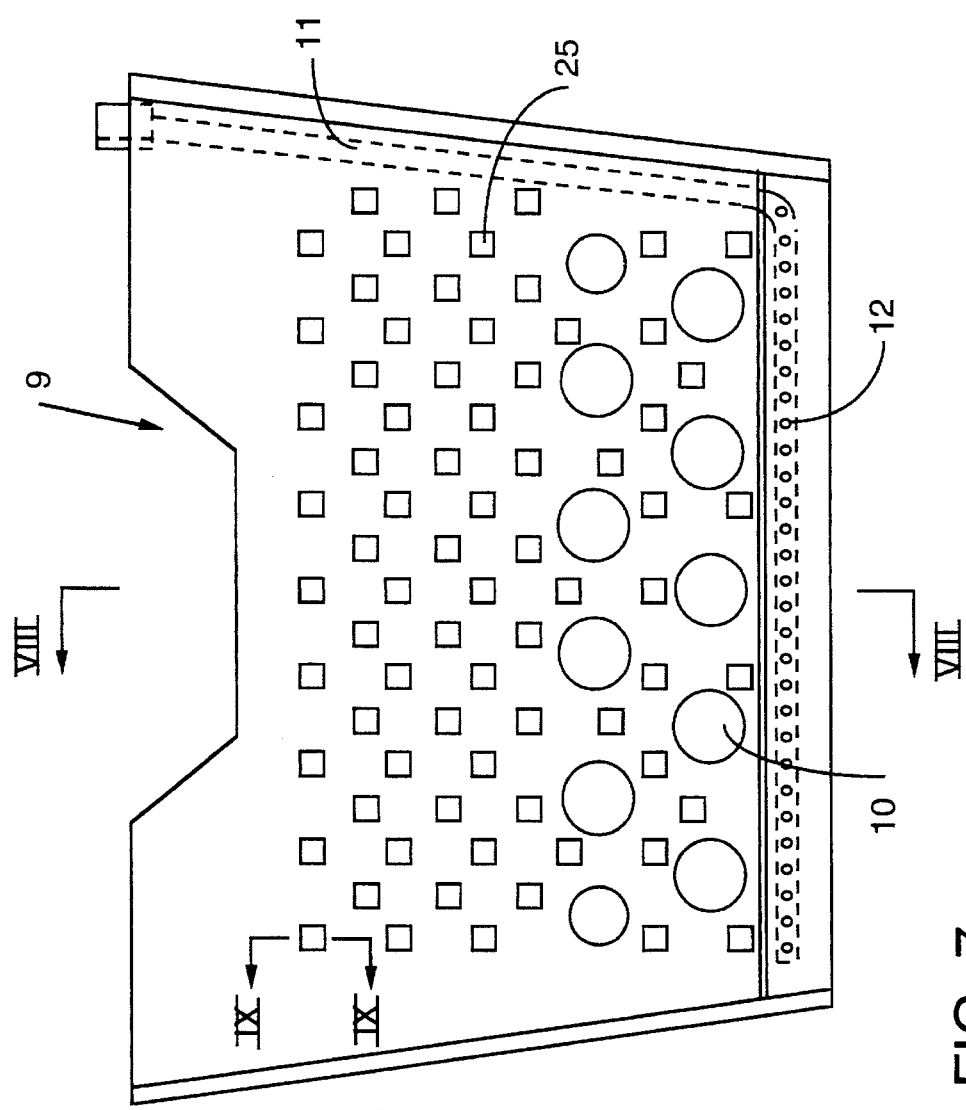
FIG. 7 is a longitudinal elevation view of the primary baffle wall as taken at VII—VII in FIG. 1.
Figure 8:
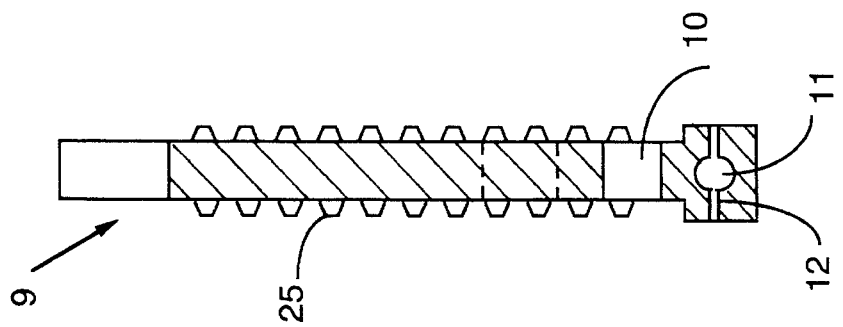
FIG. 8 is a sectional view of the primary baffle wall as viewed from VIII—VIII in FIG. 7.

The primary baffle wall (9) is the first baffle wall forming the downstream sidewall of the inlet chamber. The primary baffle wall extends completely across the tundish cavity, traversing the direction of molten steel flow. The primary baffle wall is fabricated from a molten metal resistant refractory, preferably a refractory with an alumina content greater than 65% or other suitable material. As illustrated in FIG. 7 and FIG. 8, the primary baffle wall has two rows of circular passages (10), near the base of the primary baffle wall, for the passage of molten metal. The bottom row of passages are five in number and next higher row of passages are six in number. The openings permit molten metal to flow freely and unfiltered through the primary baffle wall.

There is an inert gas pipe (11) inside the base of the primary baffle wall for supplying inert gas to about 25 nozzles (12) on each side of the baffle wall. The nozzles inject inert gas into the molten metal stream forcing increased molten metal flow upwardly along the upstream face and downstream face of the primary baffle wall. A continuous strip or strips of porous refractory material may also be used for the injection of the inert gas.

Figure 9:
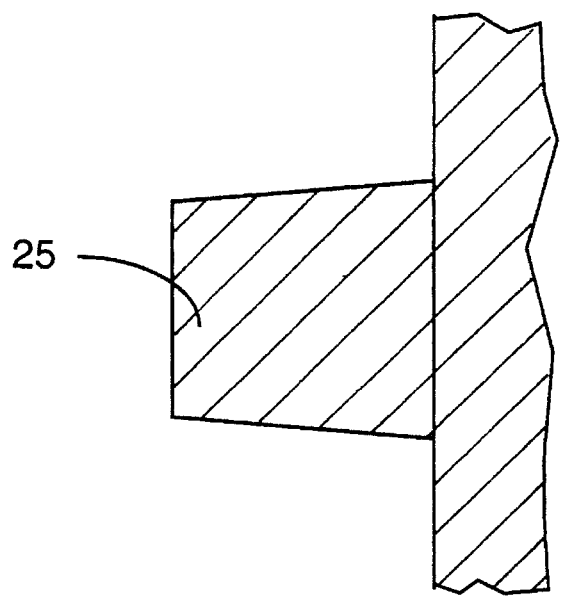
FIG. 9 is a refractory protrusion as viewed from IX—IX in FIG. 7.
Figure 12:
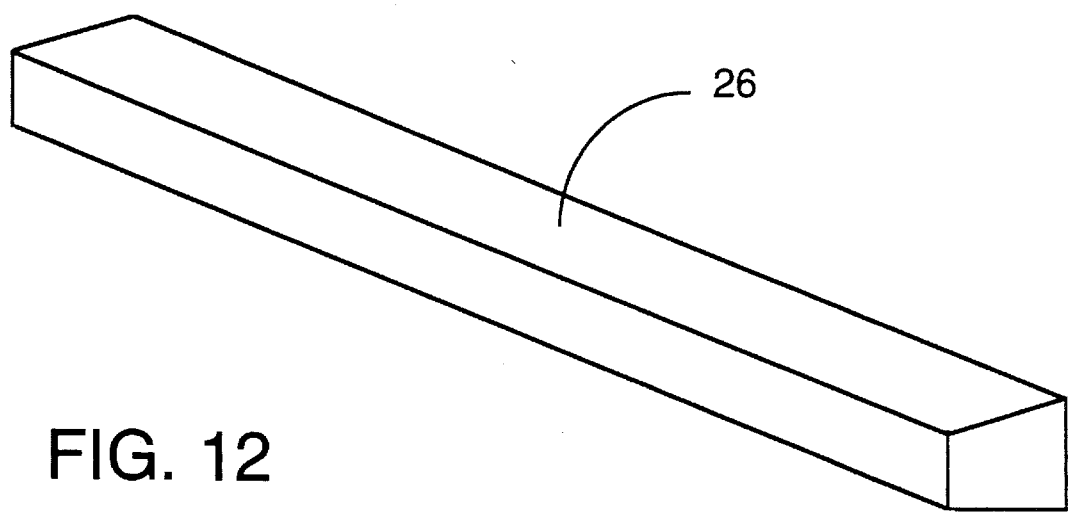
FIG. 12 is an isometric view of an elongated protrusion.

Each side of the primary baffle wall has a plurality of refractory protrusions (25) extending outwardly from the primary baffle wall planar surface into the molten metal. The preferred shape of a protrusion is illustrated FIG. 9. In one embodiment, the protrusions are in a staggered row arrangement with about 11 rows and about 8 to 9 protrusions per row, unless interrupted by the passages through the primary baffle wall. The protrusions protrude a distance which is preferably within a range of from about ¼ inch to about 3 inches in a direction normal to the direction of molten metal flow. The area of the outer surface of each of the protrusions is desirably within a range of from about 0.3 square inches to about 300 square inches. The protrusions are also preferably spaced at least about ½ inch center to center, but no more than about 10 inches center to center. In an alternate embodiment, the protrusions may be horizontally elongated (26), as shown in FIG. 12, so as to extend continuously from one upright edge of the primary baffle wall to an opposite upright edge thereof. The same protrusion distance spacing and outer surface limitations apply to this embodiment as the one just mentioned.

The flow of molten steel in the inlet chamber is illustrated in FIG. 5. The molten steel is introduced to the inlet chamber at the inlet stream (13) and flows toward the primary baffle wall. The inert gas bubbles (14) injected into the molten steel rising along the planar surface of the primary baffle wall causes molten steel to flow upwardly with the gas bubbles. The protrusions disrupt the boundary layer of molten metal flowing along the baffle wall surface as the molten metal flows over and around the protrusions. As a result of the disruption in molten steel fluid flow caused by protrusions, eddies occur in the molten metal stream adjacent to the protrusions. The eddies provide for enhancement of the mechanism by which inclusions deposit on refractory surfaces.

FIG. 1 illustrates a dam (15) immediately downstream from the primary baffle wall. The dam is also of a refractory resistant to molten metal and of a height so that it is near the level of the top opening of the primary baffle wall. The dam traverses across the fluid flow direction. The dam functions to provide assistance in directing the molten metal flow up the downstream side of the primary baffle wall, as illustrated in FIG. 5, thus enhancing further the inclusion deposition.

Figure 10:
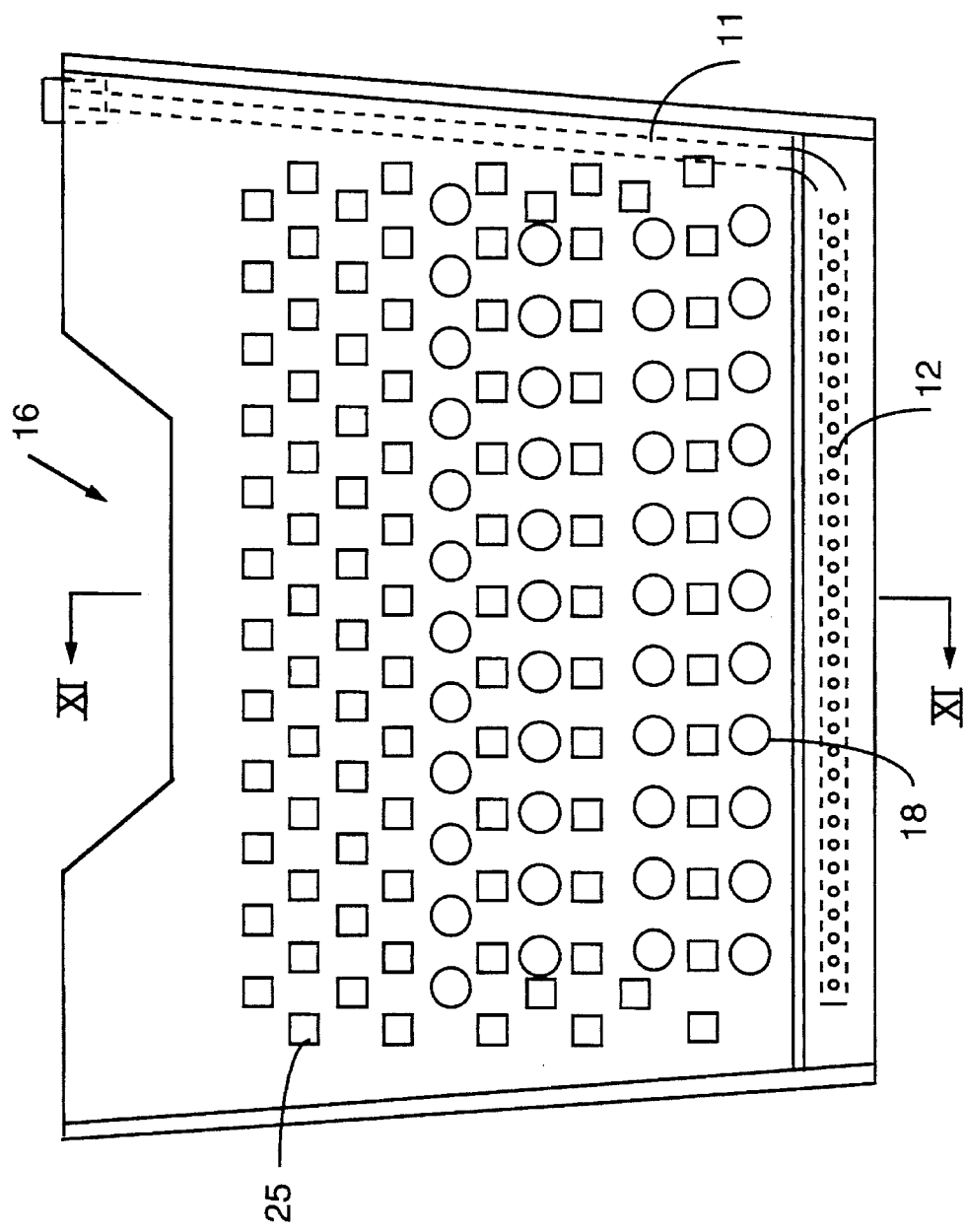
FIG. 10 is a longitudinal elevation view of the secondary baffle wall as viewed from X—X in FIG. 10.
Figure 11:
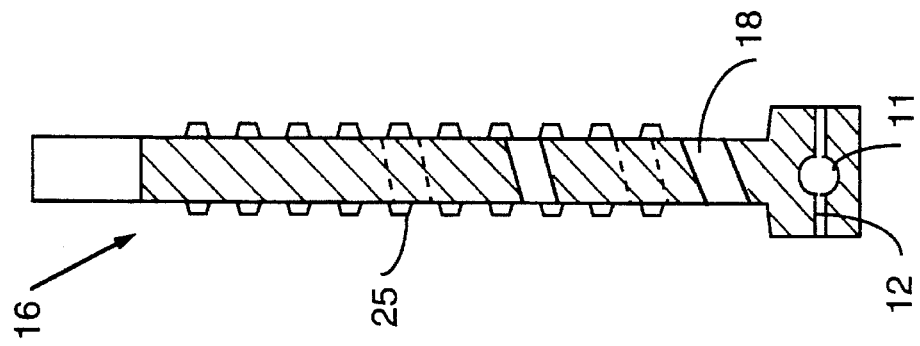
FIG. 11 is a sectional view of the secondary baffle wall taken at XI—XI in FIG. 4.

FIG. 10 and FIG. 11 illustrate a secondary baffle wall (16) which is located downstream from the refractory dam. The secondary baffle wall is made of a molten steel resistant material of at least 65% alumina and extends completely across the tundish cavity, traversing the direction of molten metal flow, with overall dimensions similar to the primary baffle wall. The secondary baffle wall also has protrusions mounted in the same pattern as the primary baffle wall, differing from the primary baffle wall according to differing locations of passages. The protrusion distance, spacing and outer surface area of the protrusions on the secondary baffle are within same ranges as on the primary baffle wall. The protrusions on the secondary baffle wall may also be of the elongated alternate form described with respect to the primary baffle wall. Finally, it is contemplated that other refractory walls of the tundish may also have protrusions as well. The primary baffle wall and secondary baffle wall enclose the first intermediate chamber (17). The secondary baffle wall and the filter wall enclose the second intermediate chamber (21). The chamber downstream from the filter wall is the discharge chamber (22).

The preferred embodiment of the secondary baffle wall has four rows of passages (18), each passage having a diameter adequate for permitting the flow of molten metal from the first intermediate chamber to the second intermediate chamber. The passages are oriented in an inclined position to achieve the desired molten metal flow circulation in the second intermediate chamber. The secondary baffle wall is equipped with similar inert gas injection capabilities as the primary baffle wall which serves the same purpose of enhancing inclusion deposition adjacent to the protrusions on the secondary baffle wall.

As will be appreciated from the above description, the present invention may be embodied in other forms without varying from the essential characteristics or specific aspects of this invention. Adaptations of this invention by those skilled in the art, that do not vary from these essential characteristics are intended to fall within the meaning of what is claimed by this invention.

I claim:

1. A tundish for use with molten metal comprising:
a container having refractory bottom and a plurality of refractory side walls forming a cavity for holding and directing the flow of molten metal therein; at least one refractory filter wall extending completely across the cavity to opposed refractory side walls of the container, said refractory filter wall being of essentially the same height as the refractory side walls and extending transverse to the direction of molten metal flow so as to divide said cavity into at least one upstream chamber and at least one downstream chamber; said refractory filter wall having filter means for removing inclusions from said molten metal as the molten metal flows from the upstream chamber through the filter means to the downstream chamber, said filter means having an initial flow resistance coefficient that is a design characteristic of said filter means; said container having at least one passage for permitting unfiltered flow of a portion of the molten metal from the upstream chamber to the downstream chamber, said passage having a cross sectional area greater than 0.75 square inches, said cross sectional area of the passage being selected based upon said initial flow resistance coefficient of the filter means so as to accomplish a desired initial distribution of the volume of flow of molten metal through said filter means with respect to the volume of flow through said opening.

2. A tundish according to claim 1 wherein said filter means comprises a plurality of openings each with a cross sectional area less than 0.75 square inches.

3. A tundish according to the claim 1 wherein said filter means comprises at least one porous ceramic filter element mounted in said refractory filter wall.

4. A tundish according to claim 1 wherein the initial ratio of the total cross section area of said passage for permitting unfiltered flow to the initial total open cross section area of said filter means does not exceed 1.0.

5. A tundish according to claim 1 wherein said passage for permitting unfiltered flow of molten metal is located in said refractory filter wall.

6. A tundish according to claim 1 further comprising a flow control device for regulating volume of molten metal through said passage for permitting unfiltered flow so as to adjust the distribution of flow of molten metal through the filter means and the unfiltered flow thereof.

7. A molten metal filtration apparatus for use in a tundish, comprising:

at least one refractory filter wall for extending completely across a cavity in the tundish in a direction transverse to a direction of molten metal flow therein so as to divide said tundish cavity into at least one upstream chamber and at least one downstream chamber; said refractory filter wall having filter means therein for removing inclusions from said molten metal as the molten metal flows through said filter means, said filter means having an initial flow resistance coefficient that is a design characteristic thereof; said refractory filter wall having at least one opening forming a passage through said refractory filter wall for permitting unfiltered flow of a portion of the molten metal from the upstream chamber to the downstream chamber of the tundish cavity, said opening having a cross sectional area greater than 0.75 square inches, said cross sectional area of the opening being selected based upon said initial flow resistance coefficient so as to accomplish a desired initial distribution of the volume of flow of said molten metal through said filter means with respect to the volume of flow through said opening.

8. A molten metal filtration apparatus according to claim 7 wherein said filter means comprises a plurality of openings each with a cross sectional area less than 0.75 square inches.

9. A molten metal filtration apparatus according to claim 7 wherein said filter means comprises at least one porous ceramic filter element mounted in said refractory filter wall.

10. A molten metal filtration apparatus according to claim 7 wherein the initial ratio of the total cross section area of said opening forming a passage for unfiltered flow to the initial total open cross section area of the filter means does not exceed 1.0.

11. A molten metal filtration apparatus according to claim 7 further comprising a flow control device for regulating volume of molten metal through said passage for permitting unfiltered flow so as to adjust the distribution of flow of molten metal through the filter means and the unfiltered flow thereof.

* * * * *